(12) United States Patent
Martinsen et al.

(10) Patent No.: US 7,383,512 B1
(45) Date of Patent: Jun. 3, 2008

(54) METHOD FOR SYNCHRONOUSLY BINDING AN EXTERNAL BEHAVIOR TO A WEB PAGE ELEMENT

(75) Inventors: Ronald R. Martinsen, Sammamish, WA (US); David H. Massy, Redmond, WA (US); Joseph S. Beda, Seattle, WA (US); Richard John Gardner, Redmond, WA (US); Bulusu K. Mohan, Redmond, WA (US); Alexander J. Zotov, Bellevue, WA (US); John M. Harding, Seattle, WA (US); Robert A. Relyea, Bellevue, WA (US); Markus W. Mielke, Bellevue, WA (US); Dave Cox, Redmond, WA (US); Kris Markel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 09/677,445

(22) Filed: Sep. 29, 2000
(Under 37 CFR 1.47)

(51) Int. Cl.
*G06F 3/00* (2006.01)

(52) U.S. Cl. .................. 715/749; 715/760; 715/751; 715/748; 715/738; 707/10; 707/102; 707/203

(58) Field of Classification Search ............... 345/749, 345/760, 825, 861, 733, 751; 707/10, 102, 707/203; 715/749, 760, 751, 733, 825, 861, 715/881, 748, 738, 740, 968, 764
See application file for complete search history.

(56) References Cited

U.S. PATENT DOCUMENTS

| 6,266,681 | B1* | 7/2001 | Guthrie ................... 715/501.1 |
| 6,347,398 | B1* | 2/2002 | Parthasarathy et al. ..... 717/178 |
| 6,397,217 | B1* | 5/2002 | Melbin ........................ 707/10 |
| 6,411,988 | B1* | 6/2002 | Tafoya et al. ............... 709/204 |
| 6,668,369 | B1* | 12/2003 | Krebs et al. ................ 717/125 |
| 6,674,450 | B1* | 1/2004 | Toub et al. ................. 715/749 |
| 6,920,607 | B1* | 7/2005 | Ali et al. .................. 715/501.1 |

* cited by examiner

*Primary Examiner*—Weilun Lo
*Assistant Examiner*—Mylinh Tran
(74) *Attorney, Agent, or Firm*—Workman Nydegger

(57) ABSTRACT

A new form of DHTML behaviors, called "Element Behaviors," wherein a behavior component is bound to an HTML element, and not just attached to the element as with attached behaviors. A special processing instruction is used to import the Element Behavior into a Web page. Upon parsing the Web page, the Element Behavior is initialized as soon as it has been downloaded and parsed. This immediate initialization makes the Element Behavior declaratively available to bind synchronously to the element(s) it is modifying. A viewLink is a feature of Element Behaviors that permits encapsulation of a behavior component file (e.g., an HTC file) so that the structure of the HTC file is transparent to a Web page ("primary document") to which the HTC file is linked, but the content of the HTC file may be displayed in the primary document. The viewLink provides a pointer to the content in the encapsulated HTC file, and renders that content in the primary document, without incorporating the elements of the encapsulated HTC file into the primary document structure.

4 Claims, 8 Drawing Sheets

METHOD FOR SYNCHRONOUSLY BINDING AN EXTERNAL BEHAVIOR TO A WEB PAGE ELEMENT

FIELD OF THE INVENTION

The invention relates generally to computer systems, and more particularly to the creation and subsequent rendering of web pages on a computer system.

BACKGROUND OF THE INVENTION

Dynamic HTML (DHTML) attached behaviors are simple, lightweight components that encapsulate specific functionality or behavior on a page. When applied to a standard HTML element on a page, a DHTML behavior component enhances that element's default behavior. For example, an attached behavior component can be created that toggles the display property of an element's children on a mouse click. When this attached behavior component is applied to a standard unordered list (UL) element on a page, it enhances the unordered list element's default behavior to expand and collapse when clicked. Similarly, another attached behavior component can incrementally set the position of an element from a start point to an end point on the screen, whereby if such a behavior component is applied to an image element, the otherwise statically positioned image "flies" across the screen.

DHTML attached behaviors add great value to a Web application environment, making things easier for everyone involved in the Web development process. Typically, this environment consists of a team of content designers, designers, and developers. Content designers are responsible for writing content. Designers determine what interactive effects can be added to the content, while developers implement those effects. Prior to DHTML behaviors, the task of adding interactive effects to a page involved a lengthy iterative process between the designer and the developer trying to give the page the proper look. The designer, usually with limited programming background, mocked up the desired effect on the content in a desktop publishing environment, and worked closely with the developer to achieve the same effect on the page, usually with scripts.

With DHMTL attached behaviors, a developer can work independently on encapsulating the desired effect in a separate behavior component file, while the designer applies that attached behavior component to elements on the page with a few attributes. By providing a simple declarative syntax, requiring no prerequisite knowledge of scripting and DHTML, DHTML behavior components empower Web designers to easily add interactive effects to an otherwise static content.

DHTML attached behaviors were introduced in Microsoft® Internet Explorer 5.0 product, and are described in U.S. patent application Ser. No. 09/316,897, entitled "Dynamic Web Page Behavior," owned by the assignee of the present disclosure, and incorporated herein by reference. With attached behaviors, behavior components are attached to Cascading Style Sheet (CSS) elements and modify their behavior. Attached behaviors bind asynchronously to the elements that they affect, and can be attached or removed from an element programmatically.

One problem with attached behaviors is that a Web designer revising the CSS may inadvertently detach an attached behavior component from the element that it is modifying. Alternatively, a Web designer revising the CSS may detach an attached behavior component from the element it is modifying by calling the removeBehavior method in script. Such removal may have an adverse effect on some of the existing document, which may not be readily apparent to the Web designer. In addition, an attached behavior is affected by the CSS style of the element to which it is attached, so the appearance of the element may be different from what the behavior designer intended as a result of CSS inheritance. Finally, attached behaviors are often unpredictable in the asynchronous parsing of a document, because attached behaviors are sometimes not instantiated at the time dependent elements try to access them.

SUMMARY OF THE INVENTION

The present invention provides a new form of DHTML behaviors, called "Element Behaviors," wherein a behavior component is bound to an HTML element, and not just attached to the element as with attached behaviors. A special processing instruction is used to import the Element Behavior into a Web page. Upon parsing the Web page, the Element Behavior is initialized as soon as it has been downloaded and parsed. This immediate initialization makes the Element Behavior declaratively available to bind synchronously to the element or elements it is modifying. When an Element Behavior is implemented with a HTML Component (HTC) file, it is automatically downloaded as a part of the Web page, and the result is a browsing experience where the behavior component download is transparent to the client.

Element Behaviors can be used like any other element in an HTML document. In addition, the Element Behavior cannot be disconnected from the underlying element using script or any other mechanism.

A default object may be used to set and retrieve the default properties for the behavior component of an Element Behavior. When an Element Behavior is implemented with a HTML Component (HTC) file, this object has a declarative form, the PUBLIC:DEFAULTS element, which is used in the component definition section of an HTC to set the initial state of the behavior's properties.

A viewLink is a feature of Element behaviors that permits encapsulation of a visual representation (the "behavior component display") that a behavior component may provide to a page so that the structure of the behavior component display is transparent to a Web page ("primary document") to which the behavior component is linked, but the content of the behavior component display may be displayed in the primary document. In the case where a behavior component is implemented in an HTC file, the behavior component display may be the content within the HTC file. The viewLink provides a pointer to the behavior component display, and renders the behavior component display in the primary document, without incorporating the elements of the encapsulated behavior component display into the primary document structure.

In accordance with another aspect of the present invention, a new HTML Component (HTC) is provided called "Lightweight HTC." Lightweight HTC is an HTC file that does not use or render its own static HTML content. With Lightweight HTC, unnecessary parsing and the creation of empty document trees is eliminated. Therefore, the result of using a Lightweight HTC is that the page loads much faster, especially when multiple instances of the same behavior are used.

In accordance with another aspect of the present invention, a "Literal Content" component is defined. When a Literal Content component is utilized, text surrounded by the Literal Content component is not parsed or added to the document tree, but it is accessible using script or via a binary programming interface. This feature permits a Web page designer to add content to an Element Behavior that may be used to implement, for example, a XML island or a Script tag. As an example, a script may be provided to use the Element Behavior content, manipulate it, or parse it in whatever way is necessary to implement a behavior component.

Other advantages will become apparent from the following detailed description when taken in conjunction with the drawings, in which:

DETAILED DESCRIPTION

Exemplary Operating Environment

Figure 1:
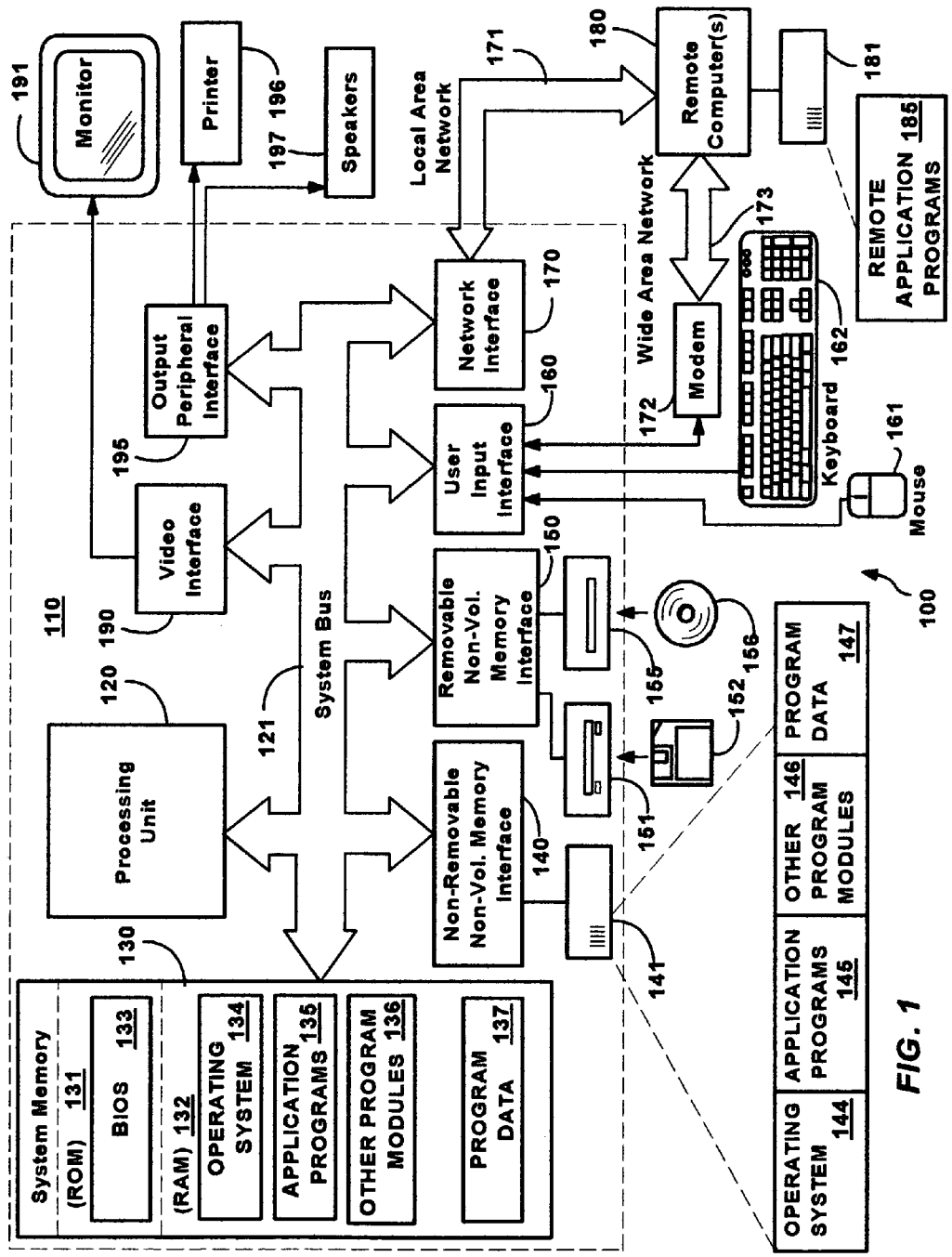
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Element Behaviors

DHTML behaviors are components that encapsulate specific functionality or behavior on a page, but are external to the page. DHTML Behaviors can be used to implement anything from a simple rollover effect to a complex interactive component. The present invention provides a new form of DHTML behaviors, called "Element Behaviors." Element Behaviors enable web developers to define new elements for use by web page designers, called "Custom Elements," wherein the Custom Elements are defined by the behavior or functionality of the Element Behavior. To define the behavior of a Custom Element, a web page designer provides a processing instruction for importing the Element Behavior into a web page. Once made available to a web page, the Element Behavior binds with the Custom Element, and appears to the page developer the same as any intrinsic element (e.g., <P>, <B>, <INPUT>).

Importing an Element Behavior into a Web page via the processing instruction permits the Element Behavior to be available declaratively to bind synchronously to the Custom Element or Elements. Once an Element Behavior has been downloaded and parsed, it is available to be instantiated. Once a tag representing that Custom Element is parsed, an instance of the Element Behavior is created and exists as a first-class element in the document hierarchy and remains permanently bound to the Custom Element. The binding process assures that an instance of an Element Behavior cannot be disconnected from the Custom Element using script or any other mechanism. In this manner, a web page designer may utilize the Custom Element and be confident that the functionality of the Element Behavior cannot be removed from the Custom Element. Element Behaviors differ from attached behaviors in this respect. An attached behavior binds asynchronously to an element and modifies its behavior, and it can be attached or removed programmatically.

Figure 2:
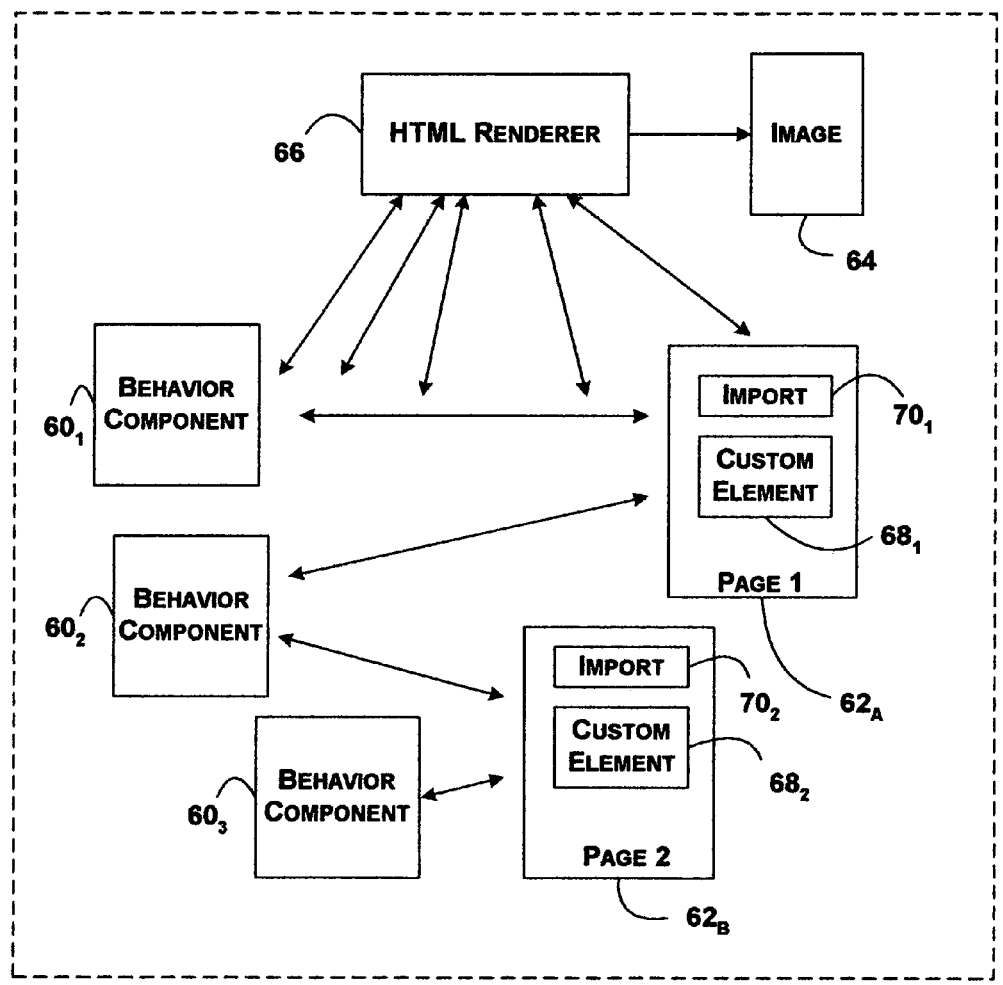
FIG. 2 is a block diagram representing a number of external behavior components and multiple pages that reference those components for use in rendering an image in accordance with one aspect of the present invention.

In accordance with one aspect of the invention and as represented in FIG. 2, Element Behaviors are provided in behavior components $60_1$-$60_3$, which include external behavior code with respect to pages $62_A$, $62_B$. The behavior components $60_1$-$60_3$ may also include static HTML and/or other content, as described below. The behavior components $60_1$-$60_3$ are encapsulated components, and the code of a behavior component may be reused across multiple pages. As a result, improved manageability of pages $62_A$, $62_B$ is provided. For example, as represented in FIG. 2, the page $62_A$ includes elements that reference and (when parsed by an HTML renderer 66) use two external behavior components $60_1$ and $60_2$, while the page $62_B$ has elements that also use (another instance) of the behavior components $60_2$ along with the external behavior component $60_3$.

The renderer 66 outputs and/or modifies an outputted image 64 based on the Element Behaviors. A preferred renderer 66 is Microsoft Corporation's Internet Explorer 5.5 rendering engine (mshtml.dll along with other code modules, including but not limited to iepeers.dll), which, in addition to being able to handle behavior components, provides data manipulation, formatting, and content changes without dependency on a Web server. With such an engine, enhanced programmatic access and control is provided, the location of objects and images can be precisely specified, and HTML tags, style sheets, text, tables, and ActiveX objects can be handled without requiring interaction with a Web server.

In the implementation shown in FIG. 2, the pages $62_A$, $62_B$ include at least one Custom Element $68_1$, $68_2$, respectively, and an import instruction $70_1$, $70_2$, respectively. As described below, in accordance with one aspect of the present invention, the import instruction 70 links implementation of an Element Behavior with a Custom Element 68. When an Element Behavior is linked to a Custom Element 68 on a page, the behavior and/or functionality of the Element Behavior 60 defines that element. For example, an Element Behavior 60 can be written to set bold and italic font style for text. When a Custom Element 68 is linked with such an Element Behavior 60, hen the Element Behavior is downloaded and initialized, the Custom Element changes the default style for text contained by the Custom Element to bold and italic.

To define the functionality of an Element Behavior, a developer or the like first develops a behavior component (e.g., $60_1$ of FIG. 2) using script, or alternatively by using a language such as C++ to create a binary file. More particularly, the behavior component for an Element Behavior can be written in script using script component technology to provide a safe extensibility mechanism for those that are familiar with script and the Dynamic HTML Object Model. HTML Components (HTC) provide a mechanism to implement components in script as Dynamic HTML (DHTML) behaviors. Saved with an .htc extension, an HTC is an HTML file that contains script and a set of HTC-specific elements that define the component. An HTML Parser (e.g., the renderer 66) or the like converts the script to a COM object. Element Behaviors created in C++ use an OBJECT tag syntax to instantiate, and may be directed to a specific platform, for example, to access Win32 Application Programming Interfaces (APIs) and the interfaces for implementing DHTML behavior components. Binary behaviors may also be provided by a host of the rendering engine, in which case no OBJECT tag is required.

As is known, to define a behavior component using an HTC file, the PUBLIC:COMPONENT element is used, which provides a container for other elements that define the behavior component interface and set the default properties of the behavior component. In accordance with one aspect of the present invention, a new attribute, called "tagName," is defined for the <PUBLIC:COMPONENT> element. The tagName attribute defines a portion of the name of the Custom Element. As described below, to prevent name conflicts, in accordance with one aspect of the present invention, when a Web page designer utilizes a Custom Element 68 on a Web page, the Web page designer is required to associate the tag name of the behavior component with a Namespace. The Namespace can be anything the designer chooses, but only one tag with a given name can exist within a single Namespace. This requirement assures consistent use of a Custom Element throughout a Namespace.

In the following example, a "checkers" Custom Element is implemented.

```
<PUBLIC:COMPONENT tagName="checkers">
</PUBLIC:COMPONENT>
```

The attributes of a Custom Element can be defined by using the PUBLIC:PROPERTY element. The following sample adds an attribute, named boardwidth, to the checkers Custom Element:

```
<PUBLIC:COMPONENT tagName="checkers">
    <PUBLIC:PROPERTY NAME="boardWidth" />
</PUBLIC:COMPONENT>
```

A script function inside an HTC file can be made public to other components or to script in the primary document. In the following sample, a PUBLIC:METHOD element is added to the component; this uses the newGame function to start a new game of checkers. Also, a PUBLIC:ATTACH element is added to map a mouseover function to handle instances of the onmouseover event.

```
<PUBLIC:COMPONENT tagName="checkers">
    <PUBLIC:PROPERTY NAME="boardWidth" />
    <PUBLIC:METHOD name="newGame ( )" />
    <PUBLIC:ATTACH event="onmouseover" onevent="mouseover ( )" />
</PUBLIC:COMPONENT>
<SCRIPT Language="Javascript">
function newGame ( ) {
// insert code to initialize a new game here
}
function mouseover ( ) {
// insert code to handle mouseover events
}
</SCRIPT>
<BODY>
</BODY>
```

To complete the behavior, elements may be added inside the PUBLIC:COMPONENT element to define the remaining methods, properties and event handlers for the checkers component. A completed checkers component may include the script for the checkers game as well. Once completed, the implementation of a game of checkers is completely encapsulated in the Checkers.htc file.

Note that the implementation of the checkers component contains no references to a Namespace; the Namespace is declared in the primary document, as described below. The same Element Behavior can actually be imported into multiple Namespaces within a single primary document, and although this technique is not used in the sample, it may be useful with many other types of components.

A special processing instruction (e.g., the import instruction 70) is used to import the Element Behavior into a Web page (e.g., the page $62_A$). The HTML document first declares a Namespace, which is used to ensure that the Element Behavior has a unique qualifier. The page designer needs to associate the tag name with a Namespace. The following HTML element declares a Namespace called "games" using the XMLNS attribute.

<HTML XMLNS:games>

The XMLNS (XML Namespace) is an attribute of the HTML tag and serves as a mechanism for specifying user-defined Namespaces. A Namespace may be declared in other ways. For example, the import instruction 70 may include an attribute (e.g., declareNamespace) for declaring a Namespace. In addition, a new Namespaces collection is exposed off the document object. Using this collection, a web designer can enumerate to determine what Namespaces have been added to the document, as well as import behaviors into the Namespaces of the designer's choice.

In any event, the next step is to provide instructions to import the Element Behavior into the Namespace, e.g., via the import instruction 70. To this end, there is provided a new tag, IMPORT. In the following example, the games Namespace imports the implementation of the Checkers.htc file using the IMPORT tag.

<?IMPORT Namespace="games" implementation="checkers.htc">

The IMPORT tag is a Processing Instruction, or PI, and uses "<?" to start the tag instead of the "<" character, which is used with regular HTML elements. When the browser begins processing the IMPORT directive, it suspends some other threads and activity until the contents of the Element Behavior file have been downloaded. This permits the Element Behavior to be available declaratively to bind synchronously to the Custom Element or Elements. As an example of threads that may be suspended, the tokenizer object for the page may be suspended. However, there may be instances where the tokenizer thread may need to continue to run if there are tokenizers that need running. Since it is a processing instruction, the import PI may appear anywhere in the page, as long as it appears before the first use of a Custom Element that is defined by the Element Behavior. This feature allows the web page designer to write code with confidence that the Element Behavior that was imported will be available (assuming a successful import) immediately after the parsing instruction.

The Custom Element or Elements 68 may then be inserted in the body of the document 62. A Custom Element can be used like any other tag, except that the Custom Element uses its Namespace as the prefix. Thus, the syntax for the Custom Element is <Namespace>:<tagName>. The Custom Element for the checkers game could be defined as follows:

<games:checkers></games:checkers>

A simple Custom Element does not need to be defined as a block element, so in this case the following form can also be used:

<games:checkers />

If a Custom Element is used without a closing tag, as in the above example, the last element attribute is required to be separated from the terminating /> characters, or the value of the attribute has to be bounded by quotes.

The complete HTML file, which implements the checkers element, is shown below:

```
<HTML xmlns:games>
<?IMPORT Namespace="games"
  implementation="checkers.htc">
    <BODY>
    <games:checkers />
    </BODY>
</HTML>
```

As described above, Element Behaviors may also be implemented with binary DHTML behavior components, which would typically be written with a language such as Visual C++. As with Element Behaviors implemented using script, for binary Element Behaviors, a Namespace is declared, instructions for importing the Element Behavior are provided, and the Custom Element or Elements are inserted into the document. The following HTML code sample illustrates an example of how to import a binary DHTML behavior in the primary document.

```
<html xmlns:mybb>
<head>
<object id=mytag . . . ></object>
</head>
<?import Namespace=mybb implementation=#mytag >
<body>
<mybb:mytag></mybb:mytag>
</body>
</html>
```

The example contains the OBJECT element in the <HEAD> section, which is recommended for binary DHTML behaviors. The id attribute has the value mytag (with the remaining attributes for the element not shown for simplicity). The binary behavior is imported using a similar approach to the method used for HTC files, except that the implementation attribute is set to #mytag, which references the OBJECT elements id.

Components formed using HTC files are likely to be favored over implementation of binary behavior components, mainly because of the ease at which a behavior component may be implemented in script. In addition, browser security issues are somewhat simplified when using HTC files to implement Element Behaviors, primarily because the client must provide permission before a binary component is downloaded to the browser. In contrast, when an Element Behavior is implemented with a HTC file, it is automatically downloaded as a part of the Web page, and the result is a browsing experience where the component download is transparent to the client.

One significant benefit resulting from the use of Element Behaviors is that the IMPORT tag causes the Element Behavior to be downloaded and understood (parsed) as soon as the IMPORT tag has been parsed. This means that as soon as the IMPORT tag is processed, instances of whichever Element Behaviors were specified will be immediately available. Thus, the Element Behaviors are available declaratively to bind synchronously to Custom Elements. Therefore, it is not necessary to add event-handling functions to check to see if the component has been downloaded and initialized.

ViewLinked Element Behaviors

A viewLink is a feature of Element behaviors that permits encapsulation of a visual representation (the "behavior component display") that a behavior component may provide to a page so that the structure of the behavior component display is transparent to a Web page ("primary document") to which the behavior component is linked, but the content of the behavior component display may be displayed in the primary document. The viewLink provides a pointer to the behavior component display, and renders the behavior component display in the primary document, without incorporating the elements of the encapsulated behavior component display into the primary document structure.

A viewLink is not limited to providing a pointer to the behavior component file, but may provide a pointer to any document having content. This document may be, for example, an HTC document, a document fragment, or a document that is created via CreateDocumentFromUrl.

As described above, a regular (non-viewLinked) Element Behavior defines a Custom Element. To distinguish the two, when discussing an Element Behavior that uses a viewLink, the Custom Element in the primary document is referred to herein as the "Master Element."

Figure 3:
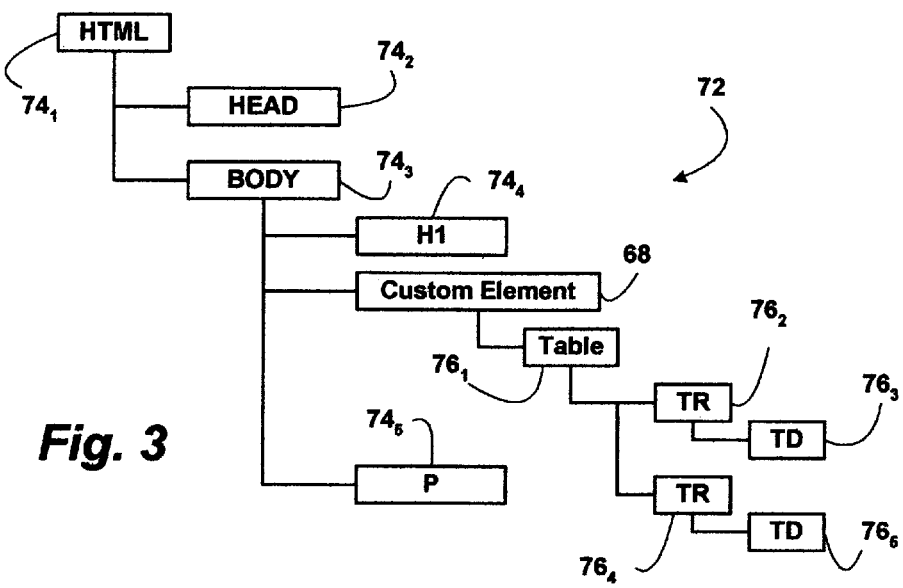
FIG. 3 is a representation of a document tree representing elements hierarchically arranged on a web page and having a Custom Element injected in the tree in accordance with one aspect of the present invention.

As is known, in general, an HTML document, or page, may be considered a document tree, in that elements are contained by other elements in a hierarchical manner. Indeed, the renderer 66 logically constructs such a tree when provided with a page, (e.g., $62_A$ of FIG. 2), whereby attributes and the like may be applied appropriately to elements as events are received, i.e., the events bubble up through the tree. A simple document tree structure 72 for a primary document (i.e., a page that has been rendered) is shown in FIG. 3. A Custom Element (e.g., the Custom Element 68) has been implemented in the primary document. The HTML document tree 72 includes elements $74_1$-$74_4$ as nodes of the primary document tree 72. As described above, the import process for an Element Behavior binds the Element Behavior with a Custom Element so that the Element Behavior becomes an element in the primary document. Thus, in FIG. 3, the Custom Element 68 is shown as an element in the tree. As described below, elements $76_1$-$76_5$ of the Element Behavior may be injected into the primary document tree so as to form a branch of the tree (referred to herein as the "document fragment"). Thus, if so injected, the elements $76_1$-$76_5$ of the Element Behavior are displayed in the HTML document tree for the primary document, such as is shown in FIG. 3.

Figure 4:
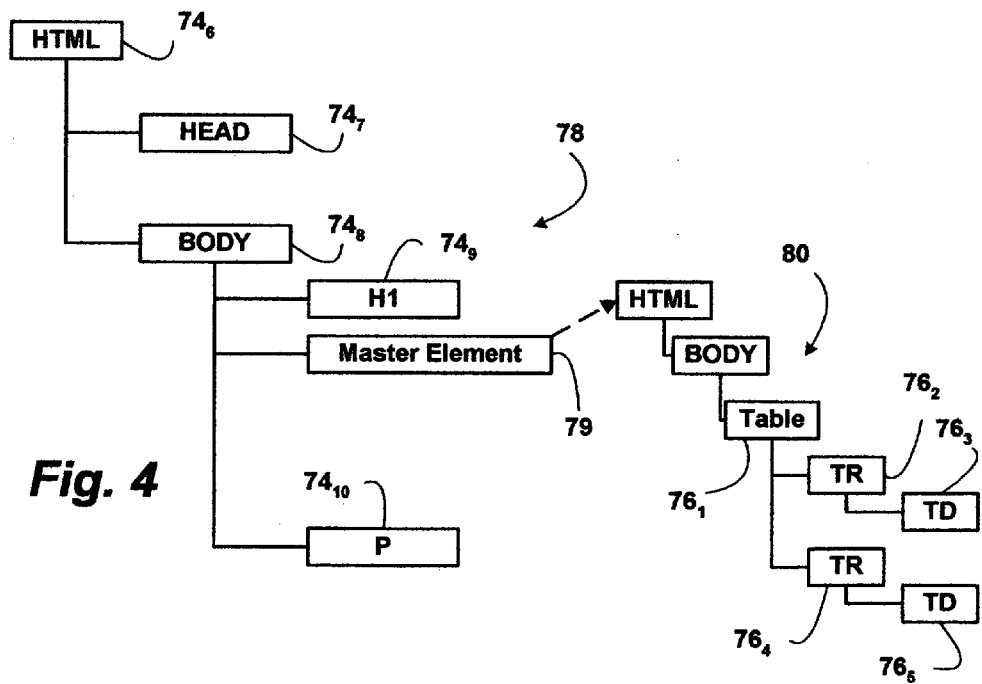
FIG. 4 is a representation of a document tree representing elements hierarchically arranged on a web page and having a Master Element injected in the tree in accordance with one aspect of the present invention.

FIG. 4 shows a document tree 78 for a primary document, similar to the document represented in FIG. 3, but in which a Master Element 79 (i.e., an element defined by a viewLinked Element Behavior) is implemented in the primary document. In contrast to FIG. 3, the elements that make up the viewLinked Element Behavior are not displayed with or attached to the primary document tree 78, and therefore are not visible in the document tree of the primary document. Instead, only the Master Element 79 participates in the primary document tree 78. The elements $76_6$-$76_{10}$ that make up the viewLinked Element Behavior are contained in a document fragment 80. The document fragment 80 of a viewLinked Element Behavior does not appear in the primary document tree, but it is maintained separately. The Master Element serves as a pointer to the document fragment so that the content in the document fragment is displayed at the location of the Master Element in the primary document.

To create a viewLinked Element Behavior, a developer or the like first creates the behavior component file (in binary or script) for the Element Behavior. For ease of understanding, creation of the behavior component file is discussed here with reference to an HTC file. However, if desired, the behavior component file may be implemented as a binary file.

An HTC file is essentially a regular HTML document, so it can contain HEAD and BODY elements, as well as other standard HTML elements, but it is only necessary to include the elements that define the behavior and the document content. For Element Behaviors that use ViewLink, the HTC file contains two main sections. The first section is the component definition, which is the PUBLIC:COMPONENT element and the elements contained within it. The PUBLIC: COMPONENT element contains declarations that define the interface for the behavior in terms of its methods, properties, and event handling. The second section is the document fragment, which is contained inside the BODY element. This may include static HTML or other content that is to be displayed in the primary document. Thus, the structure of a viewLinked Element Behavior formed via an HTC file preferably follows the following format:

```
<HTML>
    <HEAD>
        <PUBLIC:COMPONENT tagname=tagnamehere>
            <PUBLIC:PROPERTY ... >
            ...
            <PUBLIC:METHOD ... >
            ...
            <PUBLIC:EVENT ... >
        </PUBLIC:COMPONENT>
    </HEAD> ...
    < SCRIPT language=<language type>>
        ...
    </SCRIPT>
    <BODY>
    (Content to be displayed in primary document)
    </BODY>
</HTML>
```

The HTML and HEAD tags are optional. As with a non-viewLinked Element Behavior, the name of the Master Element is declared in an HTC file using the tagName attribute in the PUBLIC:COMPONENT element (or similarly in a binary component), as shown in the example above (i.e., "tagnamehere").

The defaults object is used to set and retrieve the default properties for Element Behaviors, and viewLink is one of the properties of this object. A viewLink is established for an Element Behavior when the viewLink property is set to an object that contains document content. The object that is assigned to the viewLink property is the document fragment. By default, an Element Behavior does not have a viewLink defined, so the initial value of the viewLink property is undefined.

The PUBLIC:DEFAULTS element is the declarative form of the defaults object. The attributes supported by the PUBLIC:DEFAULTS element correspond to the properties collection of the defaults; so either script or declarations can be used to set the defaults object properties. The PUBLIC: DEFAULTS element is used in the component section of an HTC file, where the initial properties of the defaults object can be set.

For example, to set up a viewLink between a primary document and a document fragment using script, the following statement can be used. This statement is placed within script located in the HTC file, preferably after the PUBLIC:COMPONENT element.

defaults.viewLink=document;

A viewLink can also be established using a declaration in the component definition. The following example automatically links the root element of the document fragment in the HTC file to the Master Element in the primary document.

<PUBLIC:DEFAULTS viewLinkContent= "true"/>

Thus, either of the foregoing may be placed in the HTC file to implement the ViewLink.

After the HTC file has been implemented for the viewLinked Element Behavior, a web designer provides an import instruction for importing the viewLinked Element Behavior into the primary document (e.g., the IMPORT tag). A Namespace is declared the primary document, and the Master Element may be inserted into the document utilizing the Namespace as its prefix, followed by a colon (:), and then the tag name. As many Master Elements as necessary can be included in the primary document.

When the primary document is instantiated by the renderer 66, the viewLink provides a pointer to the document fragment so that the content of the document fragment is displayed at the location(s) of the Master Element(s) in the primary document. As with non-viewLinked Element Behaviors, the viewLinked Element Behavior is available declaratively after it is downloaded and parsed. The contents of the viewLinked Element Behavior, however, do not become a part of the document structure.

The following example of an HTC file (WIDGET.HTC) illustrates one possible use of a viewLinked Element Behavior:

```
WIDGET.HTC
<PUBLIC:COMPONENT tagName=WIDGET>
<PUBLIC:DEFAULTS viewLinkContent= "true" />
</PUBLIC:COMPONENT>
<BODY>
<TABLE>
<TR><TD>This is my WIDGET. Notice the
encapsulation? - no lines!</TD></TR>
<TR><TD>This content will be rendered instead of
the Alternate HTML string because the viewLink has
been set to the document of the HTC.</TD></TR>
</TABLE>
</BODY>
```

A document (WIDGET.HTM) that includes a Master Element to WIDGET.HTC follows:

```
WIDGET.HTM
<HTML xmlns :MYNAMESPACE>
<STYLE>
TD { background-color: lines; }
</STYLE>
<?IMPORT Namespace=MYNAMESPACE
implementation="WIDGET.htc">
<BODY>
<MYNAMESPACE:WIDGET>Alternate HTML for browsers
that don't support element
behaviors</MYNAMESPACE:WIDGET>
<TABLE>
<TR><TD>This is my table in the primary
doc</TD></TR>
<TR><TD>Notice how the cells have
lines?</TD></TR>
</TABLE>
</BODY>
</HTML>
```

Figure 5:
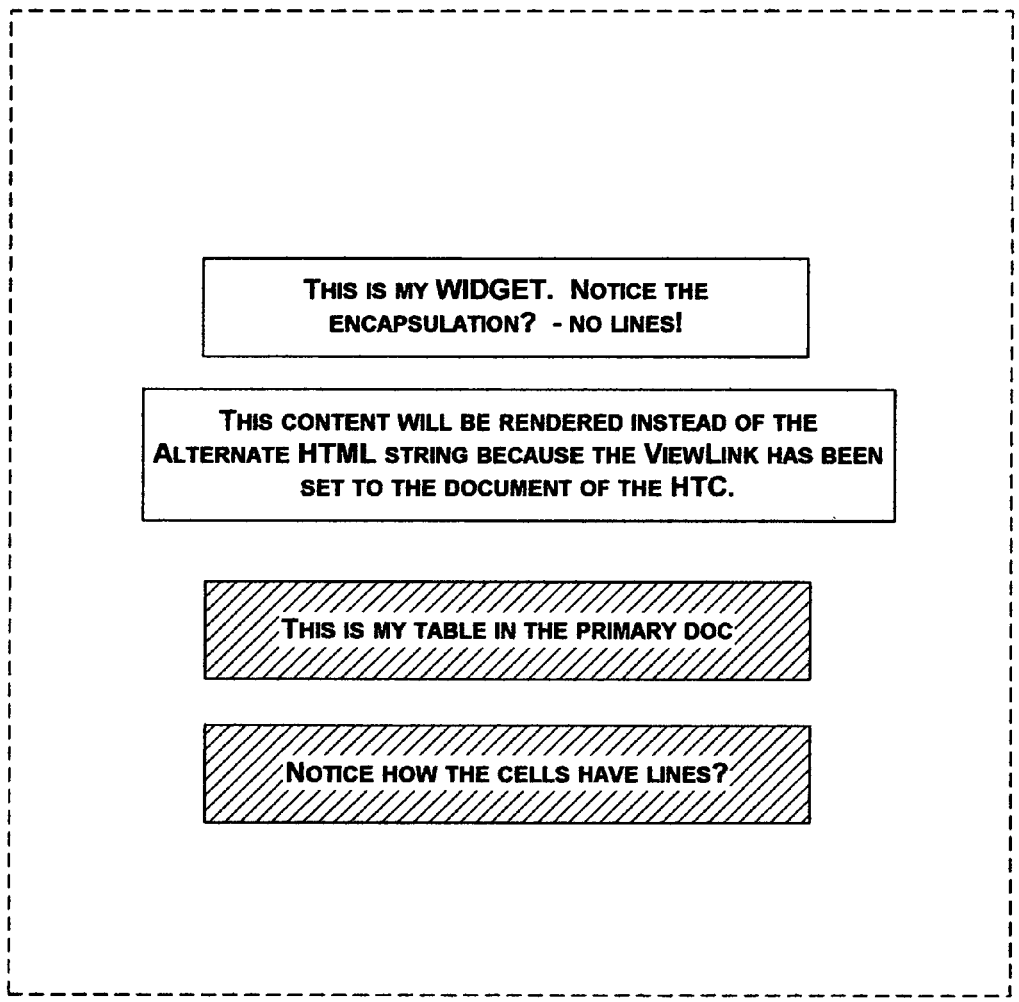
FIG. 5 is a representation of an image of four tables representing how a viewLinked External Behavior may be used in accordance with one aspect of the present invention.

The result of rendering WIDGET.HTM is shown in FIG. 5. In the example, the viewLinked Element Behavior WIDGET.HTC uses a table to display its content. Likewise, the primary document WIDGET.HTM uses a table to display its content, but further includes a default background style for the table elements in the primary document. If the elements in the WIDGET.HTC file were inside a non-viewLinked Element Behavior, those elements would inherit the default background style property when the document is parsed. This result may be undesirable, depending on the requirements for the component.

For the viewLinked (shown) version of WIDGET.HTC, applying the default background style in the primary document has no effect on the rendering of the table in the Master Element file. That is, the lines that are the default style for the background of the tables in the primary document are not applied to the tables in the HTC file. The example illustrates the difference in Cascading Style Sheets (CSS) inheritance for each variation. Encapsulation of element behaviors via ViewLinks makes it possible for content or script in the Element Behavior to not be directly affected by the primary document.

When a viewLink is used, script in the primary document does not affect the rendering of the content in the HTC file, unless public methods and properties are added to the HTC file definition to make this possible. A viewLinked Element Behavior may be completely encapsulated such that it's functionality, methods, and style sheet properties are completely hidden from the primary document. Conversely, a viewLinked Element Behavior may be designed to provide an extensive interface of methods and properties, enabling rich interaction between the primary document and the component.

Figure 6:
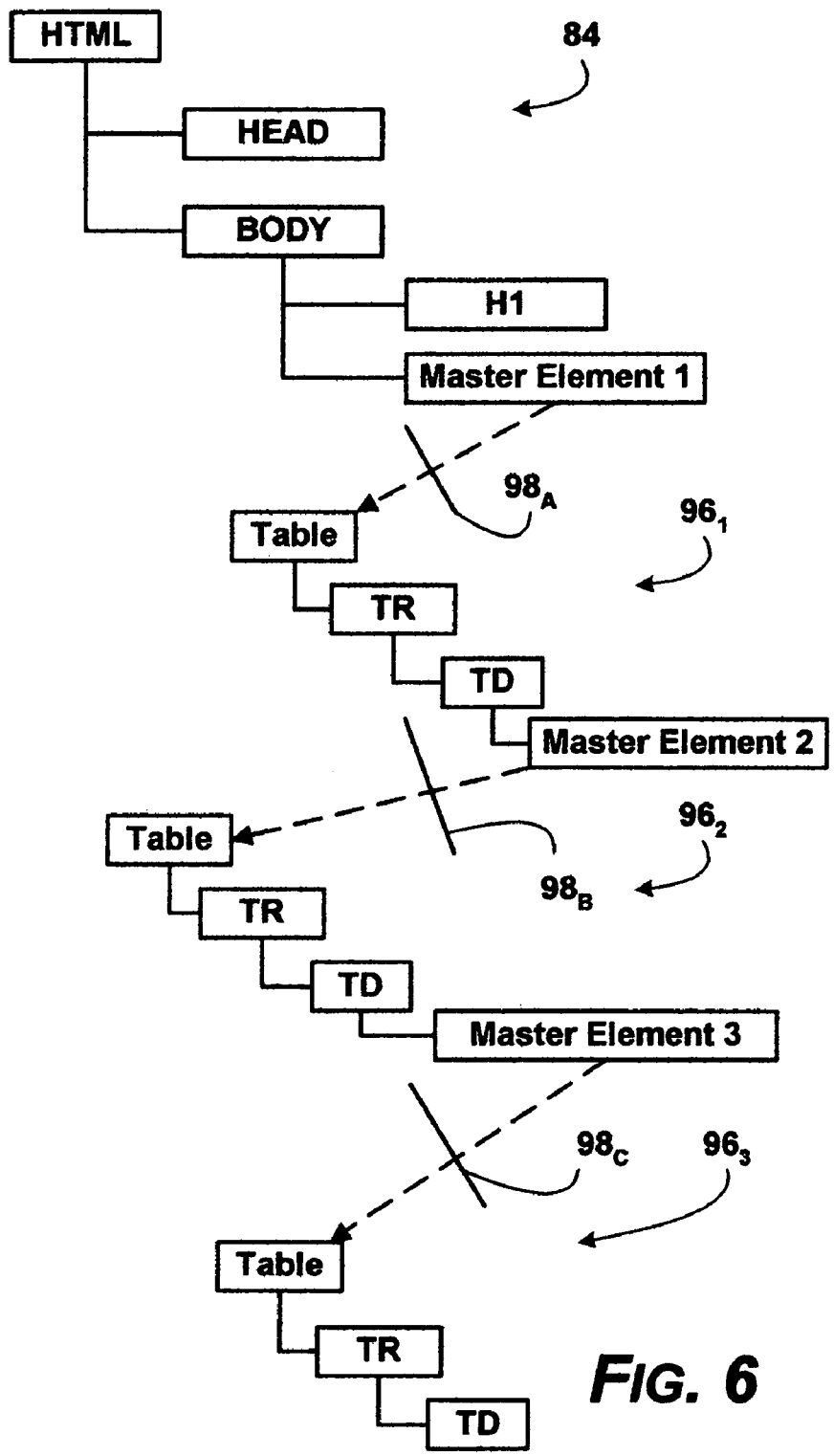
FIG. 6 is a representation of a document tree representing elements hierarchically arranged on a web page and having a plurality of nested Master Elements in accordance with one aspect of the present invention.

A useful feature of viewLink is that it enables the developer to partition the document tree into multiple document fragments by using nested viewLink components. FIG. 6 shows an example of a document tree 84 having several document fragments $96_1$-$96_3$. In effect, a viewLink builds logical partitions $98_A$-$98_C$ (FIG. 6) between the document fragment tree and the primary document tree or the corresponding document fragment. The partition 98 may be used to prevent events, properties, or styles from being passed across the partition.

There are scenarios where it may be desirable or efficient to abstract content and script into multiple layers. As one example, a web designer may insert a calendar Master Element into a primary document. If a Master Element were not used, the web designer would have to insert the necessary table for the calendar into the document (using attached behaviors or other techniques). The table in the calendar would be subject to the changes made to the primary document. For example, if a second designer were to set a CSS attribute to make the backcolor of TD pink, then the table that forms the calendar that was created by the first designer would be pink, even though that is probably not what either designer intended. The encapsulation of ViewLinks allows the first designer to define a calendar element, and have each instance (tag) of that element isolated from the primary document. Thus, if the calendar was implemented as a table in the behavior code of the Element Behavior, the calendar would not be subject to CSS inheritance from the primary document, because to the CSS the calendar is a calendar, not a table.

Many problems encountered with the development of DHTML behaviors are avoided when an Element Behavior with a viewLink is used. Styles in the primary document tree are not inherited by the viewLink component unless the component designer permits it by design. Unexpected formatting of the component content can be avoided completely by defining styles in the HTC file, which take precedence over styles set in the primary document. A web designer also has the option to turn off style inheritance completely.

Lightweight HTC Files

As discussed above, an HTC file is actually an HTML document, so a document tree is built for its contents when it is parsed by an HTML Renderer (e.g., the HTML renderer 66). Thus, an HTML renderer creates a separate document tree for each use of a Behavior in a primary document. When a large number of Element Behaviors are assembled in a single page, the result is often a relatively slow page load.

It is often possible to write an HTC file that does not contain any HTML, e.g., checkers.htm above. In accordance with one aspect of the present invention, a new "lightweight" Attribute of the PUBLIC:COMPONENT element is defined to handle documents not having such content (e.g., static HTML) so that the HTC file is handled in a more efficient manner. These documents are essentially HTC behaviors that are pure programming logic with no content. The following is an example of implementation of the "lightweight" Attribute on the PUBLIC:COMPONENT element:

```
<PUBLIC:COMPONENT tagName="rollover"
lightweight = 'true' >
    </PUBLIC:COMPONENT>
```

The lightweight attribute instructs the HTML renderer that the HTC document does not contain static content, and further instructs the renderer to not parse HTML content in the file, and to not build a document tree for the HTC file. The HTC may include content, but if the lightweight attribute is set to "true," then the content is ignored by the renderer. However, scripts and supported tags in the file are parsed and acted upon. At present, only the following tags are supported for Lightweight HTC:

```
<PUBLIC:COMPONENT>
<?IMPORT>
<PUBLIC:PROPERTY>
<PUBLIC:METHOD>
<PUBLIC:ATTACH>
<PUBLIC:DEFAULTS>
<SCRIPT>
<HTML>
```

Lightweight HTC may be utilized in the implementation of both attached behaviors and Element Behaviors. With lightweight HTC, unnecessary parsing, and the creation of empty document trees, is eliminated. Therefore, the result of using a Lightweight HTC is that the page loads much faster, especially when multiple instances of the same custom tag are used.

In many applications of HTC files, a behavior does not require a viewLink to render content, or there simply might not be any content to render. In these applications, unnecessary memory usage results, which may be remedied by specifying a Lightweight component. As the <?IMPORT> processing instruction can be used in a Lightweight HTC file, it is possible to nest lightweight HTC files.

Literal Content

In accordance with another aspect of the present invention, a "Literal Content" component is defined. When a Literal Content component is utilized, text surrounded by the Literal Content component is not parsed or added to the document tree, but is accessible using script. This feature permits a Web page designer to add content between the starting and ending Custom Element tags (e.g., between <Namespace:tagName> and </Namespace:tagName>) that is not parsed, but may be used to implement, for example, an XML island or a Script tag. As an example, a script may be provided between the tags to use the Element Behavior content, manipulate it, or parse it in whatever way is necessary to implement a behavior component. This feature may be valuable when a viewLinked Element Behavior is utilized, wherein by definition the content of the Element Behavior is not made available to the primary document.

A Literal Content Element Behavior is specified by using the "literalContent" attribute on the PUBLIC:COMPONENT element, as is shown in the following example:

```
<PUBLIC:COMPONENT tagName="myTag"
literalcontent=true >
    </PUBLIC:COMPONENT>
```

Thus, content within Custom Element tags defined via the above PUBLIC:COMPONENT element is not parsed.

The innerText property is not available for a Custom Element that is implemented with a Literal Content Element Behavior. If an attempt is made to set the innerText property of the Custom Element an error occurs. If the innerText property of a Literal Content Element Behaviors is retrieved in script, it returns as null.

The innerHTML property can be used to set and retrieve the Element Behavior's Literal Content. The innerHTML property of the Element Behavior is available once the oncontentready event has fired. Therefore, an event handler should be attached to this event in a Literal Content component that retrieves the innerHTML property of the Custom Element. Otherwise, an error occurs, which indicates that the innerHTML property is not yet available.

The oncontentsave event is fired during a save, copy, get innerText, get innerHTML, or drag-and-drop operation. This event can be useful when writing a Literal Content Element Behavior.

Figure 7:
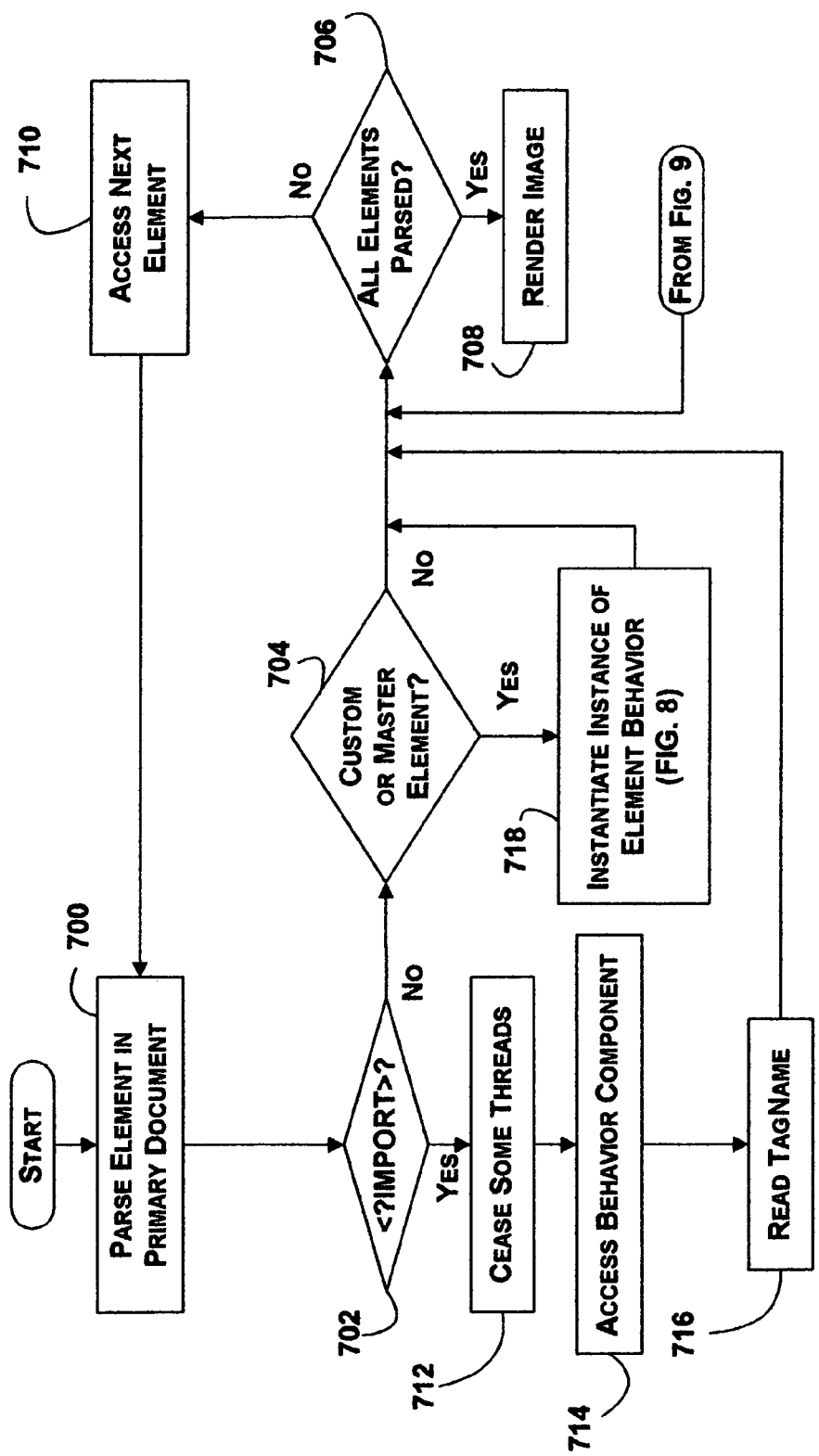
FIGS. 7-9 show a general overview of a process for parsing a document that implements an Element Behavior in accordance with one aspect of the present invention.
Figure 8:
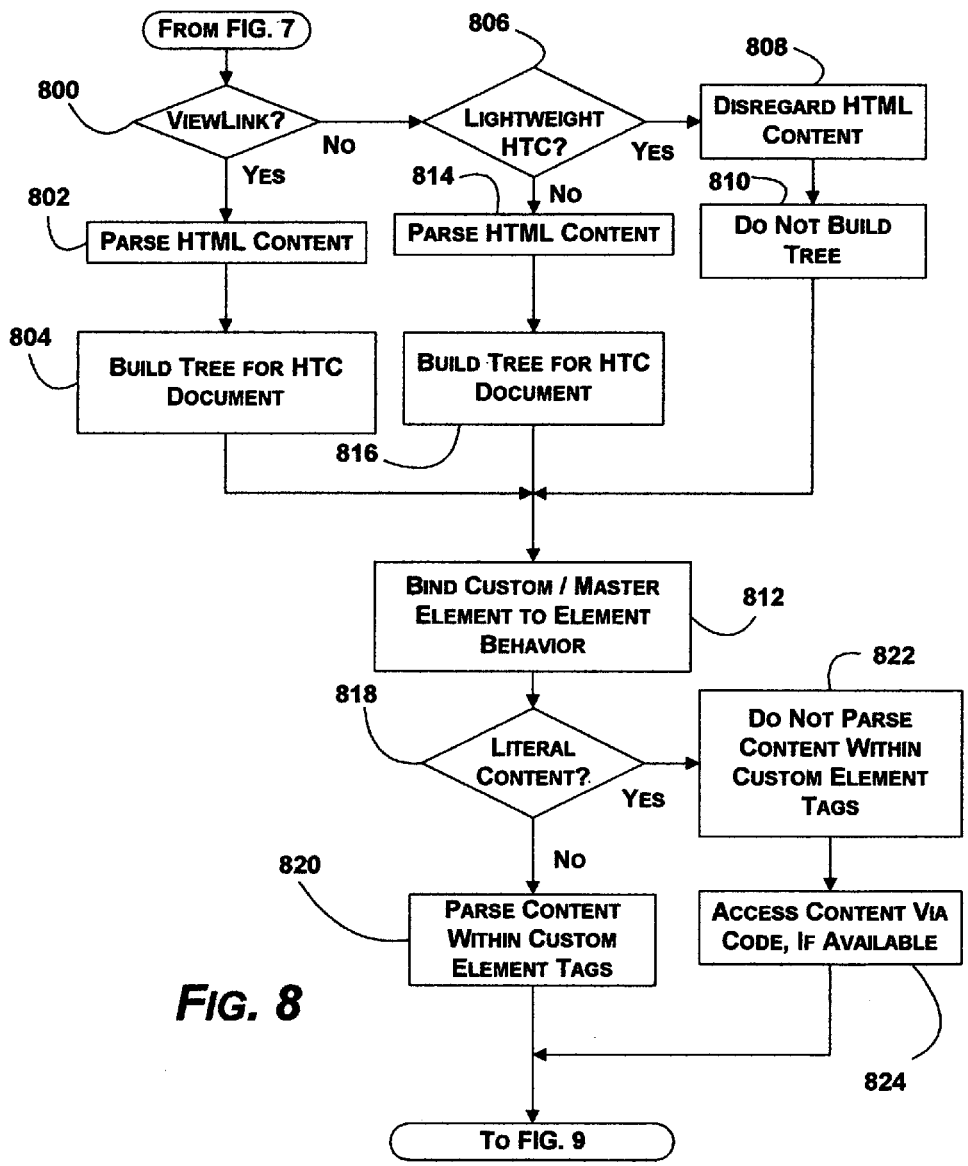
Figure 9:
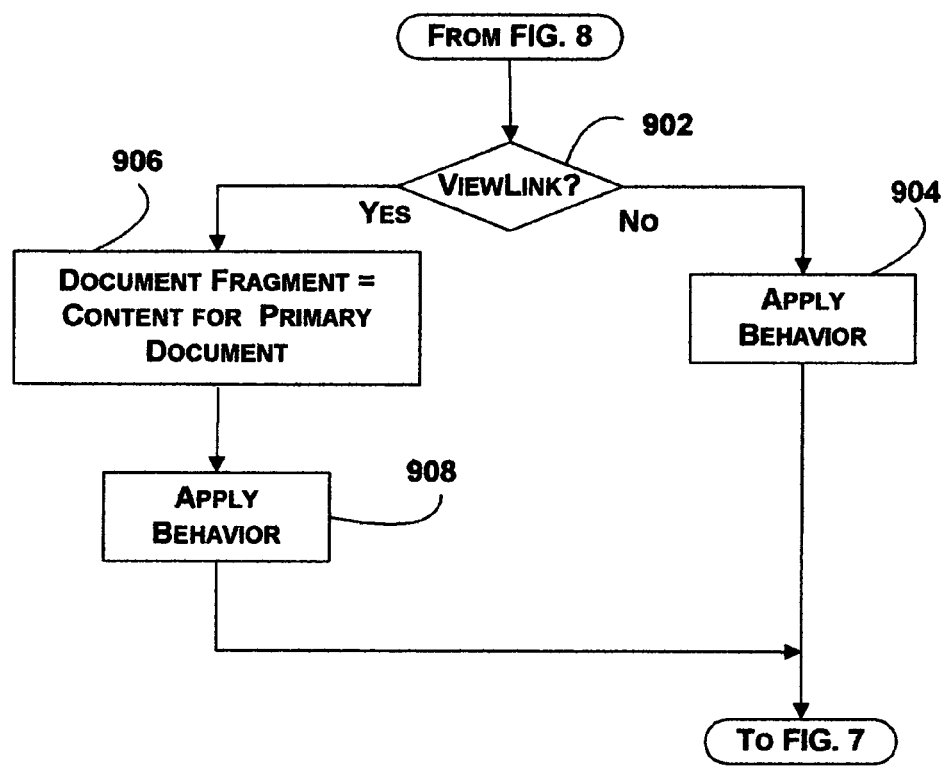

Turning now to an explanation of the operation of the present invention, FIGS. 7-9 show a general overview of a process for rendering a document that implements an Element Behavior in accordance with one aspect of the present invention. The process is described from the perspective of the renderer 66. For ease of understanding, the Element Behavior in the description is implemented in an HTC behavior component. Beginning at step 700, the renderer begins parsing the primary document by parsing an element in the document. If the element does not include the IMPORT tag, then step 702 branches to step 704, where a determination is made whether the element includes a custom or master element. If not, then step 704 branches to step 706, where a determination is made whether all elements have been parsed. If so, then the image is rendered in the conventional manner at step 708. If all elements have not been parsed, then step 706 branches to step 708, where the next element is accessed, and the process loops back to step 700 where the next element is parsed.

If a parsed element includes the IMPORT tag, then step 702 branches to step 712, where the IMPORT processing instruction may instruct the renderer to cease some threads with respect to the page (described above), and to access the behavior component 60 (step 714). This may require download of the behavior component 60 or accessing the behavior component in another manner (e.g., via a cache).

Once the behavior component is accessed, the renderer reads enough of the behavior component to read the tag name (step 716). Then the process loops back to step 706, where a determination is made whether all elements have been parsed (described above).

If a parsed element is either a Custom Element or a Master Element, step 704 branches to step 718, where an instance of the element behavior is instantiated, described in FIG. 8. After instantiation, the threads that were stopped in step 712 may be continued.

As can be understood by referencing FIG. 7, a primary document may have multiple IMPORT tags so as to associate the document with multiple Element Behaviors. In addition, the document may include one or more custom or master elements for each Element Behavior.

FIG. 8 shows a general overview of parsing of the behavior component upon instantiation in accordance with one aspect of the present invention. Beginning at step 800, if the viewLink property is set to an object containing document content, then step 800 branches to step 802, where the HTML content of the HTC document is parsed. A document tree is built for the HTC document in step 804. The Custom Element or Master Element is then bound to the instance of the Element Behavior (step 812).

If the viewLink property is not set, then step 800 branches to step 806, where if Lightweight HTC is implemented in the behavior component, the process branches to step 808, where the lightweight attribute instructs the HTML renderer that the HTC document does not contain static content, and further instructs the renderer to not parse HTML content in the file, e.g., to not build a document tree for the HTC behavior component (step 810). The Custom Element or Master Element is then bound to the instance of the Element Behavior (step 812).

If Lightweight HTC is not implemented in the HTC behavior component, then the renderer 66 parses the HTC document, including HTML content (step 814). A document tree is built for the HTC behavior component (step 816). The process then proceeds to step 812, where the Custom Element or Master Element is bound to the instance of the Element Behavior.

Step 818 returns to parsing of the primary document after the HTC document has been parsed and the Element Behavior has been instantiated. If the Custom Element has not been implemented with Literal Content, then step 818 branches to step 820, where the content within the Custom (or Master) Element tags is parsed (if present). The process branches to FIG. 9, described above.

If the Custom (or Master) Element has been implemented with Literal Content, step 818 branches to step 822, where the content within the Custom (or Master) Element tags is not parsed. If script or other code such as a programmable API is provided to access the content within the Custom Element tags, the content within the Custom Element tags is accessed at step 824 by the code and may acted on accordingly (e.g., parsed). Step 824 then branches to FIG. 9, described above. If script is not provided to access the content within the Custom (or Master) Element tags, then step 824 branches directly to FIG. 9.

FIG. 9 shows a general overview of the effect of the viewLink upon the parsing of the primary document in accordance with one aspect of the present invention. If the HTC document does not include a viewLink, then step 902 branches to step 904, where the behavior is applied (e.g., to content with the Custom Element tags). As described above, if relevant, elements from the HTC document tree may be injected into the tree of the primary document. The process then proceeds to step 706, where parsing of the primary document continues.

If the HTC document does include a viewLink, then step 902 branches to step 906, where the Master Element sets a pointer to a document fragment. The document fragment may be, for example, the tree for the HTC behavior component. The behavior is then applied at step 908. The process then proceeds to step 706, where parsing of the primary document continues.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system that uses a markup language with a behavior component that enhances an element's behavior, a method of synchronously binding the behavior component to the element in order to prevent the behavior from being detached there from, promote predictability in the behavior, or reduce the need to add event-handling functions to check to see if the component has been downloaded and initialized, the method comprising:

receiving at a browser application an HTML page for processing and displaying one or more elements declared therein, the page comprising an import tag, which is an import instruction for importing element behavior into a namespace declared and associated with the import tag, wherein the namespace is used to ensure that the element behavior has a unique qualifier;

upon an initial automatic parsing of the import tag within the page, processing the import instruction for subsequently linking implementation of the element behavior with an element defined within the body of the page by using the namespace as part of the label for the element, wherein the element behavior is a file or binary behavior component separate from the one or more elements within the page and encapsulates specific functionality or behavior for the element defined thereby; and upon parsing of the import instruction, suspending one or more other threads, activities, or both until the contents of the element behavior have been downloaded, allowing the element behavior to be available declaratively to bind synchronously to the element; and prior to processing the element defined by the downloaded element behavior, producing an instance of the element behavior making the specific functionality immediately and declaratively available;

upon further parsing of the page, identifying that label for the element comprises the namespace; and based on the identification that the label for the element comprises the namespace, attaching the instance of the element behavior produced to the element, thereby synchronously binding the element behavior to the element.

2. The method of claim 1, wherein the namespace is the prefix of the label for the element.

3. The method of claim 2, wherein the label for the element uses a syntax <namespace:tagname>.

4. The method of claim 3, wherein the import tag identifying the import instruction is <?import>, which when parsed produces the instance of the element behavior.

* * * * *